United States Patent
Pommerer et al.

(10) Patent No.: US 9,426,552 B2
(45) Date of Patent: Aug. 23, 2016

(54) ROAD VEHICLE

(71) Applicant: Eberspächer Exhaust Technology GmbH & Co. KG, Neunkirchen (DE)

(72) Inventors: Michael Pommerer, Uhingen (DE); Viktor Koch, Plochingen (DE); Peter Wink, Göppingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 131 days.

(21) Appl. No.: 14/268,269

(22) Filed: May 2, 2014

(65) Prior Publication Data

US 2014/0328494 A1 Nov. 6, 2014

(30) Foreign Application Priority Data

May 3, 2013 (DE) .................. 10 2013 208 098

(51) Int. Cl.
| | |
|---|---|
| *H04R 27/00* | (2006.01) |
| *H04R 1/02* | (2006.01) |
| *G10K 11/22* | (2006.01) |
| *G10K 15/02* | (2006.01) |

(52) U.S. Cl.
CPC .............. *H04R 1/028* (2013.01); *G10K 11/22* (2013.01); *G10K 15/02* (2013.01); *H04R 2499/13* (2013.01)

(58) Field of Classification Search
CPC .................................................. H04R 2499/13
USPC ...................... 381/86, 302, 61; 340/446, 474
See application file for complete search history.

(56) References Cited

U.S. PATENT DOCUMENTS

| | | | |
|---|---|---|---|
| 8,873,788 B1* | 10/2014 | Coombs ............... | H04R 1/2811 181/150 |
| 2004/0170288 A1* | 9/2004 | Maeda .................. | H04R 5/04 381/86 |
| 2009/0255754 A1* | 10/2009 | Kruger ................ | F16L 55/0333 181/206 |
| 2010/0266135 A1* | 10/2010 | Theobald ............. | G10K 11/178 381/71.4 |
| 2012/0068836 A1* | 3/2012 | Konet ................... | G10K 15/02 340/425.5 |
| 2012/0312609 A1* | 12/2012 | Takewaka ........... | B60Q 5/008 180/65.1 |
| 2013/0144474 A1* | 6/2013 | Ricci ..................... | G06F 9/54 701/22 |
| 2013/0158795 A1* | 6/2013 | Hahne ................... | G06F 17/00 701/36 |
| 2013/0208912 A1* | 8/2013 | Wiederwohl ........ | B60L 3/0015 381/86 |
| 2014/0055258 A1* | 2/2014 | Grosse-Budde ...... | B60Q 5/008 340/463 |

* cited by examiner

*Primary Examiner* — Disler Paul
(74) *Attorney, Agent, or Firm* — McGlew and Tuttle, P.C.

(57) ABSTRACT

A road vehicle (1) has a drive unit (2) for driving the vehicle (1), a drive unit control device (3) for driving the drive unit (2) and at least one sound generator (4), which has at least one electroacoustic converter (10). The sound generator (4) has an emission pipe (16), which connects the sound generator (4) acoustically and fluidically directly with an emission chamber (17). The an emission chamber (17) emits the sound generated by the converter (10) during the operation of the sound generator (4). Increased reliability of operation is achieved if a generator control device (26) is coupled with the drive unit control device (3) for driving the converter (10) and the generator control device (26) drives the converter (4) as a function of the current operating state of the drive unit (2).

20 Claims, 1 Drawing Sheet

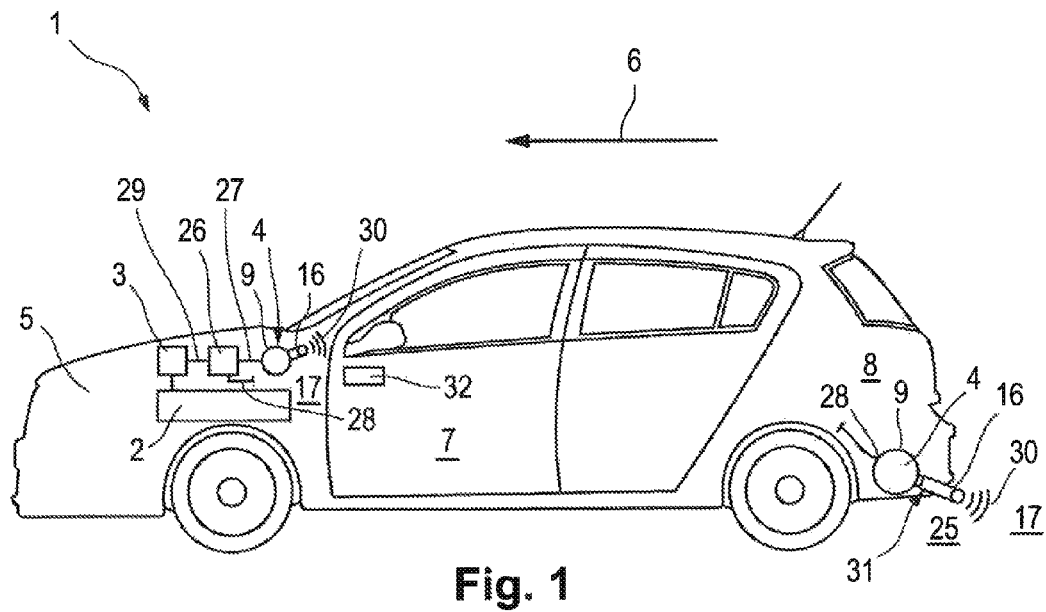
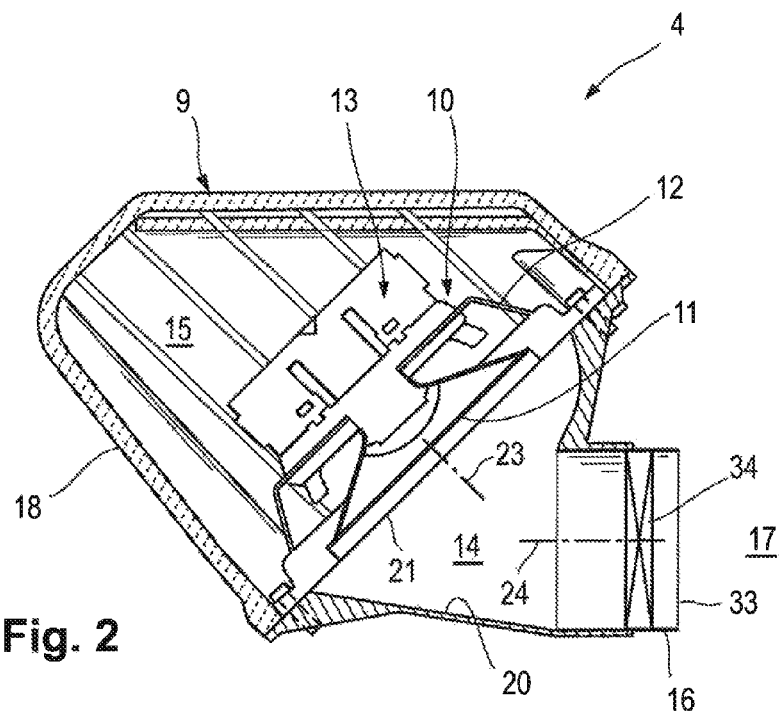

ROAD VEHICLE

CROSS REFERENCE TO RELATED APPLICATIONS

This application claims the benefit of priority under 35 U.S.C. §119 of German Patent Application DE 10 2013 208 098.0 filed May 3, 2013, the entire contents of which are incorporated herein by reference.

FIELD OF THE INVENTION

The present invention pertains to a road vehicle, which is equipped with at least one sound generator.

BACKGROUND OF THE INVENTION

Road vehicles are generally known and comprise a drive unit for driving the vehicle. To make it possible to operate the respective drive unit, a drive unit control device is usually provided, which is used to drive the drive unit.

Many road vehicles have an internal combustion engine as a drive unit. Modern internal combustion engines have a comparatively small size, which is manifested especially in a relatively small displacement. As a consequence, such internal combustion engines have a comparatively low noise level during operation. In conjunction with an improved muffling in the area of the engine compartment and/or in the area of a passenger compartment, passengers and especially the driver of the vehicle are often no longer able to recognize the current operating state of the internal combustion engine on the basis of an engine noise correlated therewith. Especially in connection with a start-stop system, which shuts off the internal combustion engine automatically when the vehicle is stopped, for example, at a traffic light and automatically restarts the internal combustion engine when the vehicle is then to start moving again, the driver of the vehicle is often unable to distinguish whether the internal combustion engine is operating or not. However, the driver of the vehicle needs to be able to identify the current operating state of the internal combustion engine quasi in the form of an acoustic feedback of the corresponding engine noise. Permanent awareness of the current operating state of the drive unit is of increased significance for increased driving safety and vehicle safety.

This problem is more acute in case of vehicles that have an electric motor as the drive unit, because an electric motor has an extremely low noise level compared to an internal combustion engine and generates operating noises that are entirely different from those of an internal combustion engine. The noises generated by an electric motor are often very unfamiliar for users of vehicles, which makes it considerably difficult to assess the current operating state of the drive unit. In addition, electric motors usually have a considerably lower noise level than internal combustion engines. This is also true of hybrid drives, in which the drive unit comprises both an internal combustion engine and at least one electric motor, and the internal combustion engine may be used as an additional drive or is used as a so-called "range extender" and is correspondingly used only to generate power for the electric motor in question rather for directly driving the vehicle. Thus, there is a need for providing an acoustic feedback for the driver of the vehicle for vehicles that have an electric motor as a drive unit as well in order to make it possible to better assess the current operating state of the drive unit.

However, the low-noise drive units of modern road vehicles may also become a problem for other traffic participants as well, such as other vehicle drivers, cyclists and pedestrians, because they are acoustically quasi unrecognizable against the usual background noise. In particular, pedestrians and cyclists are used to recognizing oncoming vehicles from their engine noise. This is quasi no longer possible in case of electric vehicles or in hybrid vehicles in the electric drive mode. Since it is very difficult to change habits, this implies a high risk potential, especially for pedestrians and cyclists.

SUMMARY OF THE INVENTION

The object of the present invention is to provide an improved embodiment for a road vehicle, which is characterized especially by increased reliability of operation.

According to the invention, a road vehicle (motor vehicle) is provided with a drive unit for driving the vehicle. A drive unit control device drives the drive unit. At least one sound generator is provided that has at least one electroacoustic converter. The sound generator has an emission pipe, which directly connects the sound generator acoustically and fluidically with an emission space and emits the sound generated by the electroacoustic converter during the operation of the sound generator. The generator control device is coupled with the drive unit control device for driving the converter and drives the converter as a function of the current operating state of the drive unit.

The present invention is based on the general idea of equipping the road vehicle with at least one sound generator, which has at least one electroacoustic converter as well as an emission pipe. The sound generator is arranged on or in the vehicle such that its emission pipe is directly connected acoustically and fluidically with an emission chamber, into which the sound generated by the converter during the operation of the sound generator is emitted. Furthermore, a generator control device is provided, which is coupled with the converter and is used to drive the converter. The generator control device provided for operating the sound generator is coupled with the drive unit control device provided for operating the drive unit, so that the generator device knows the current operating state of the drive unit. The generator control device can drive the converter depending on the current operating state of the drive unit to generate sound correlated therewith. It is possible in this manner to artificially generate engine noises of a sufficient volume by means of the sound generator, as a result of which an acoustic feedback is made possible for the current operating state of the drive unit for the driver of the vehicle. The noises generated by means of the sound generator are, in particular, louder than perceptible intrinsic noises of the particular drive unit. At the same time, it is possible as a result to improve the sound emission of the vehicle into the environment, as a result of which the acoustic perceptibility of the vehicle is facilitated. In particular, the sound generator does not operate as an active muffler that generates active noise control to reduce disturbing noise.

The sound generator has, in the usual manner, a housing, in which the at least one electroacoustic converter is arranged. Such a converter may be designed, for example, in the manner of a loudspeaker. The converter has, for example, a membrane, which separates a rear volume from a front volume in the housing. Further, the converter may have a membrane drive for driving the membrane. The membrane drive is, as a rule, an electromagnetic linear motor or solenoid. The emission pipe ultimately connects the front volume acoustically and fluidically directly with the respective emission chamber.

It may be sufficient, in principle, to equip the vehicle with a single sound generator only. If a plurality of sound generators are provided, it is conceivable to orient at least one sound generator outwardly and to orient at least one sound generator inwardly. The respective inwardly oriented sound generator improves sound emission into the passenger compartment of the vehicle, while the respective outwardly oriented sound generator improves the sound emission of the vehicle into the environment.

Provisions may be made corresponding to an advantageous embodiment for the sound generator not contacting either an exhaust system of an internal combustion engine or a fresh air feed unit of the internal combustion engine. It shall be expressed by this feature that the sound generator can be arranged on or in the vehicle quasi independently from the exhaust system and independently from the fresh air feed unit. The sound generator being used here thus differs especially from active mufflers, which may be arranged, for example, at an exhaust system or at a fresh air feed unit and which are used, as a rule, to reduce the sound emission of the internal combustion engine.

In another advantageous embodiment, the drive unit may have an internal combustion engine, which has an exhaust system and a fresh air feed unit, wherein the emission pipe of the sound generator is arranged outside the fresh air feed unit and outside the exhaust system independently from an inlet of the fresh air feed unit and independently from an outlet of the exhaust system. The sound generator corresponding to this special embodiment, which is being described here, shall also be independent from the exhaust system and independent from the fresh air feed unit in the case in which an internal combustion engine is provided.

In another advantageous embodiment, the drive unit may have at least one electric motor and an internal combustion engine, wherein the vehicle is driven by the at least one electric motor only. The internal combustion engine is used only to generate power. The generator control device can drive the converter or the membrane drive independently from the current operating state of the respective electric motor in this case. In other words, the sound generator is driven depending on the operating state of the electric drive in a vehicle with electric drive and range extender. In particular, the driving of the sound generator is independent from the operating state of the range extender. The range extender, which is preferably operated stationarily in an optimal operating range, may simulate by its noise in such a vehicle an operating state for the drive unit that has nothing to do with the current operating state of the drive unit. In particular, said noise is independent from the current speed of the vehicle. The disturbing noise of the range extender can be superimposed due to the coupling of the sound generator with the operating state of the electric motor, so that the acoustically perceptible noises can again be assigned to the operating state of the drive unit and to the driving state of the vehicle.

In another embodiment, the drive unit may have at least one electric motor, but no internal combustion engine. The generator control device can drive the converter or the membrane drive depending on the current operating state of the respective electric motor in this case as well.

Corresponding to an advantageous variant, the emission pipe of the sound generator may be designed as a tail pipe of an exhaust system and arranged in a rear area of the vehicle. It is possible as a result in an especially impressive manner to emit engine noises in the usual manner via the tail pipe, the so-called "exhaust pipe," into the environment.

In another embodiment, the sound generator may be arranged in a front space of the vehicle, which adjoins a passenger compartment of the vehicle towards the front, wherein the emission pipe of the sound generator is directed towards the passenger compartment. The passengers receive the simulated engine noises from the front from the engine compartment/front space in this case, which corresponds to the usual perception in vehicles with conventional internal combustion engine.

A safety barrier may be arranged in the emission pipe or at an emission end of the emission pipe in another embodiment. The converter can be protected by means of such a safety barrier, for example, from coarse contaminants, stone chips as well as animals.

The emission pipe may be designed for a predetermined frequency range as a tubular resonator in another embodiment. For example, the emission pipe may form a $\lambda/4$ resonator or $\lambda/2$ resonator for certain frequencies, for which an especially high amplitude shall be achieved. Certain frequencies can be significantly amplified in this manner.

According to another advantageous embodiment, the converter may be arranged in a housing of the sound generator and have a membrane, which separates a rear volume from a front volume in the housing. The front volume may in turn be arranged in a funnel, whose inlet adjoins the converter and whose outlet adjoins the emission pipe, wherein an axial direction of the outlet is sloped in relation to an axial direction of the inlet. For example, such a slope may be about 45° or more. On the one hand, the sound generator has a compact design as a result of this. On the other hand, the membrane is prevented from being exposed directly to contaminants, e.g., splash water and the like, from the outside.

In another advantageous embodiment, the generator control device may analyze a signal correlating with the operating state of the unit drive. Such signals are, for example, a current speed of the respective drive unit, a rate of load of the drive unit, which can be characterized by current values of the load and/or torque and/or output, a position of the gas pedal, especially angle and/or path of adjustment and/or gradient, information on the transmission, such as the gear selected and/or the current coupling state, as well as a current speed of the vehicle. The signal transmission may take place via conventional signal lines. In particular, signal transmission via a data bus is also possible.

Especially advantageous is an embodiment in which the generator control device drives the converter or the corresponding membrane drive as a function of the current drive output of the drive unit for generating engine noises of an internal combustion engine. The generation of engine noises, which belong to an internal combustion engine, is especially suitable for an acoustic feedback for the driver of the vehicle, because such engine noises have now customarily formed such a feedback for more than 100 years. However, the peculiarity is seen in that the sound generator can generate an engine noise belonging to an internal combustion engine even when the internal combustion engine of the drive unit is shut off or when the drive unit has no internal combustion engine at all. In particular, an electric vehicle can thus be operated with the background noise of a vehicle having an internal combustion engine.

In an advantageous variant, the generator control device may be designed to generate different engine noises, which are assigned to different types of internal combustion engines, which may differ from each other, e.g., in the number of cylinders and/or by different displacements. An operating means coupled with the generator control device, which operating means can be driven (actuated) manually by the driver of the vehicle and by means of which the current engine noise to be generated by the generator control device can be selected, may be arranged in the passenger compartment of the vehicle. In other words, the driver of the vehicle can arbitrarily select and set the type of internal combustion engine to which the engine noises generated by the sound generator shall belong. For example, the driver of the vehicle can thus make a choice between a four-cylinder in-line engine and a V8 engine. The above examples are purely arbitrary, so that any desired types of internal combustion engines with quasi any desired number of cylinders and quasi any desired displacements can be set, in principle.

According to another advantageous variant, a virtual operating state can be sent to the generator control device by means of an operating means that is coupled with the generator control device and can be driven manually independently from the actual operating state of the drive unit, and that virtual operating state is then superimposed to the actual operating state. For example, the driver of the vehicle can induce as a result an arbitrary change in the engine noise with the same type of internal combustion engine. For example, the driver of the vehicle can simulate other or higher rpms hereby. This may be advantageous, e.g., when the driver of the vehicle would like to "test," while being stopped at a traffic light, whether the drive unit is still ready to operate. This can be performed by driving the gas pedal in the disengaged state in conventional vehicles with an internal combustion engine. The driver of the vehicle will now hear immediately from the revving of the engine that everything is all right. Such a "test response" can be simulated by the suggestion of generating virtual operating states by means of an operating means.

Provisions may be made in another embodiment for the vehicle not to have a manual transmission. This is especially true of electric vehicles, in which a manual transmission can be done away with, in principle, because of the broad speed range of the electric motors. The generator control device can drive the converter or the membrane drive in such vehicles depending on the current operating state of the drive unit to vary the engine noise, such that the engine noise will also acoustically simulate shifting operations and different selected gears depending on the current operating state of the drive unit. This measure also helps vehicle drivers who are used to vehicles having internal combustion engines find their way around in vehicles with electric drives.

Furthermore, it is possible, in principle, to configure the generator control device such that it drives the converter for generating a start-up noise of an internal combustion engine when the drive unit is started, regardless of whether an internal combustion engine of the drive unit is indeed started or whether the drive unit has an internal combustion engine at all.

The above-mentioned measures shall be used, on the whole, to improve the acceptance of vehicles having an electric motor and of vehicles with very small internal combustion engines among the users.

It is apparent that the above-mentioned features, which will also be explained below, can be used not only in the particular combination indicated, but in other combinations or alone as well, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a simplified schematic diagram of a road vehicle in a side view; and

FIG. 2 is a sectional schematic view of a road vehicle.

DESCRIPTION OF THE PREFERRED EMBODIMENTS

Referring to the drawings in particular, corresponding to FIG. 1, a road vehicle 1, which is, for example, a passenger car, comprises a drive unit 2, which is used to drive the vehicle 1, a drive unit control device 3, which is used to drive the drive unit 2, and at least one sound generator 4, which is used to generate airborne noise. Two such sound generators 4 are provided in the example according to FIG. 1. For example, such a sound generator 4 may be arranged in a front space 5 of the vehicle 1, which adjoins a passenger compartment 7 towards the front in relation to a direction of travel 6 of the vehicle 1 during forward travel. Such a sound generator 4 may likewise be arranged in the rear area 8 of the vehicle 1, which adjoins the passenger compartment 7 towards the rear.

Corresponding to FIG. 2, such a sound generator 4 may have in a housing 9 at least one electroacoustic converter 10, which has a membrane 11, a cage 12 and a membrane drive 13. The membrane 11 separates in the housing 9 a front volume 14 from a rear volume 15. The membrane 11 is elastic and capable of vibrating. The membrane drive 13 is an electromagnetic actuator and can drive the membrane 11 to perform vibrations. The cage 12 is supported on the housing 9, fixes the membrane 11 and carries the membrane drive 13. The converter 10 may be designed, in principle, in the manner of a loudspeaker.

The sound generator 4 has, in addition, an emission pipe 16, which directly connects the sound generator 4 with an emission space 17 acoustically and fluidically. The emission pipe 16 specifically connects the front volume 14 with the emission space 17.

The housing 9 is assembled here from two housing parts 18, 19, one of which has a pot-shaped design and will hereinafter be called housing pot 18. The other housing part 19 is designed as a cover and will hereinafter be called housing cover 19. The converter 10 is fastened exclusively to the housing cover 19 in the example. The housing pot 18 is likewise fastened to the housing cover 19. A funnel 20, which essentially defines the front volume 14 and leads from the membrane 11 to the emission pipe 16, is formed integrally in the housing cover 19. An inlet 21 of the funnel 20 correspondingly adjoins the converter 10, while an outlet 22 of the funnel 20 adjoins the emission pipe 16. As can be recognized, an axial direction 23 of the inlet 21 and an axial direction 24 of the outlet 22 are sloped in relation to one another, for example, by about 45°.

Essentially only the housing 9 and the emission pipe 16 of the respective sound generator 4 are shown in FIG. 1. The emission pipe 16 opens into the front space 5 in the sound generator 4 arranged in the front space 5, so that the front space 5 forms the emission chamber 17 here. The emission pipe 16 opens into a surrounding area 25 on the outside at the vehicle 1 in the case of the sound generator 4 arranged in the rear area 8, so that the surrounding area 25 forms the emission chamber 17 in this case.

In addition, a generator control device 26, by means of which the respective converter 10 of the respective sound generator 4 can be driven, is provided according to FIG. 1. The generator control device 26 may be connected for this purpose with the respective sound generator 4 or with the converter 10 thereof via a corresponding control line 27 and 28, respectively. The generator control device 26 is in turn coupled via a signal line 29 with the drive unit control device 3. The drive unit control device 3 knows the current operating state of the drive unit 2. Due to the coupling between the generator control device 26 and the drive unit control device 3, the generator control device 26 also knows the current operating state of the drive unit 2. The generator control device 26 is designed and programmed such that it drives the respective sound generator 4 as a function of the current operating state of the drive unit 2 for generating and emitting sound. A corresponding sound emission is indicated by curved lines in FIG. 1 and is designated by 30.

The drive unit 2 may have an internal combustion engine for driving the vehicle 1 according to a first variant. Such an internal combustion engine has, in the usual manner, an exhaust system and a fresh air feed unit. According to a second alternative, the drive unit may have at least one electric motor for driving the vehicle 1, without an internal combustion engine being present. An internal combustion engine may be present in addition to the at least one electric motor in a third variant in order to embody a hybrid drive. Provisions may be made now for using the respective electric motor or the internal combustion engine to drive the vehicle 1 as desired. By contrast, the internal combustion engine is not used to drive the vehicle 1 directly in an alternative embodiment, but essentially for power generation only to be able to supply the respective electric motor with electric energy for driving the vehicle 1 even when corresponding batteries are depleted.

The respective sound generator 4 is preferably arranged in or at the vehicle 1 such that it does not contact either an exhaust system of an internal combustion engine that may possibly be present or a fresh air feed unit of this internal combustion engine. In particular, the respective sound generator 4 can be arranged regarding its emission pipe 16 outside the fresh air feed unit and outside the exhaust system independently from an inlet of such a fresh air feed unit as well as independently from an outlet of such an exhaust system.

If the drive unit 2 comprises only an internal combustion engine, i.e., no electric motor for driving the vehicle 1, the generator control device 26 drives the respective sound generator 4 as a function of the current operating state of the internal combustion engine. If the drive unit 2 has both an internal combustion engine and at least one electric motor for driving the vehicle 1, the driving of the respective sound generator 4 is carried out by means of the generator control device 26 depending on the current operating state of the internal combustion engine when the internal combustion engine is turned on and depending on the current operating state of the respective electric motor when the internal combustion engine is shut off. If, by contrast, the drive unit 2 comprises only at least one electric motor for driving the vehicle 1, in which case an internal combustion engine is provided for generating power, provisions are preferably made for the generator control device 26 driving the respective sound generator 4 as a function of the current operating state of the respective electric motor. If the drive unit 2 has no internal combustion engine, the generator control device 26 likewise drives the respective sound generator 4 as a function of the current operating state of the respective electric motor.

According to FIG. 1, provisions may be made in case of the sound generator 4 arranged in the rear area 8 for the emission pipe 16 to be designed as a tail pipe 31 of an exhaust system of an internal combustion engine and for correspondingly opening in the area 25 surrounding the vehicle 1. This is especially significant for the case in which the drive unit 2 comprises no internal combustion engine at all. The sound generator 4 is used here predominantly to amplify a sound emission into the area 25 surrounding the vehicle 1 in order to improve the acoustic perceptibility of the vehicle 1.

Provisions may advantageously be made in case of a sound generator 4 arranged in the front space 4 for the emission pipe 16 to be directed towards the passenger compartment 7. The acoustic feedback of the current operating state of the drive unit 2 to the passengers, especially to the driver of the vehicle, can be improved in this manner.

The generator control device 26 may be advantageously configured such that it analyzes signals that correlate with the current operating state of the drive unit 2. Such signals are, for example, a speed and a load of the respective electric motor or of the internal combustion engine. Further, such a signal may be given by the speed of the vehicle 1. The signal transmission may take place, for example, via a data bus.

Finally, it is remarkable that the generator control device 26 drives the respective sound generator 4 or the corresponding converter 10 or the membrane drive 13 thereof as a function of the current drive output of the drive unit 2 for generating an engine noise of an internal combustion engine, even if the drive unit 2 has no internal combustion engine at all. If the drive unit 2 comprises an internal combustion engine, the generator control device 26 may drive the respective sound generator 4 to emit such an engine noise even when the internal combustion engine happens to be shut off. For example, the engine noise of an internal combustion engine can be simulated in case of a hybrid vehicle with the internal combustion engine shut off, i.e., in pure electric operation. It is likewise possible in case of a start-stop operation to simulate an idling noise.

According to FIG. 1, a manually drivable operating means 32, which is coupled with the generator control device 26 in a suitable manner, may be provided in the passenger compartment 7. The driver of the vehicle is able via this operating means 32 to select and activate engine noises that are assigned to different types of internal combustion engines and are stored in the generator control device 26. For example, the different types of internal combustion engines may have different numbers of cylinders and/or different displacements.

Furthermore, it is possible, in principle, by means of such an operating means 32 to send a virtual operating state to the generator control device 26 independently from the actual operating state of the drive unit 2, and this virtual operating state will then be superimposed to the actual operating state and it will modulate this during the driving of the respective sound generator 4. For example, the driver of the vehicle can simulate as a result a "revving" of the engine when the vehicle is stopped.

If the drive unit 2 has only at least one electric motor for driving the vehicle 1, no manual transmission is necessary, in principle. Nevertheless, the driver of the vehicle may wish to perceive the typical shifting noises. According to an advantageous embodiment, the generator control device 26 may drive the respective sound generator 4 to vary the engine noise, such that the engine noise also simulates acoustically shifting operations and different selected gears depending on the current operating state of the drive unit 2. Furthermore, provisions may be made for the generator control device 26 to simulate a typical starting noise of an internal combustion engine, even if no internal combustion engine is present at all.

According to FIG. 2, a safety barrier 34, which prevents, for example, coarse dirt from entering the funnel 20, may be arranged in the emission pipe 16. Such a safety barrier 34 may also be arranged, in principle, at an outlet end 33 of the emission pipe 16. The length of the emission pipe 16 is shown in FIG. 2 purely as an example and without limitation of the general specification. Corresponding to a preferred embodiment, provisions may be made for the emission pipe 16 to be designed as a tubular resonator, which brings about an amplitude amplification at certain frequencies or in certain frequency ranges. For example, stationary waves may form at the emission pipe 16. $\lambda/4$ resonator or a $\lambda/2$ resonator can be generated as a result in case of a specific selection of the length of the emission pipe 16.

While specific embodiments of the invention have been shown and described in detail to illustrate the application of the principles of the invention, it will be understood that the invention may be embodied otherwise without departing from such principles.

What is claimed is:

1. A road vehicle comprising:
a drive unit for driving the vehicle;
a drive unit control device for driving the drive unit;
a sound generator comprising an electroacoustic converter and an emission pipe directly connecting the sound generator acoustically and fluidically with an emission space, which emission pipe emits the sound generated by the electroacoustic converter during the operation of the sound generator, the emission pipe comprising an emission pipe outlet, the sound generator being arranged in a front space of the vehicle, which the front space adjoins towards a passenger compartment of the vehicle, the front space being separated from said passenger compartment via structure, the emission pipe outlet being directed towards the passenger compartment, wherein the emission pipe outlet is arranged in said front space and the sound is emitted in said front space via the emission pipe; and
a generator control device coupled with the drive unit control device driving the electroacoustic converter, the generator control device driving the electroacoustic converter as a function of a current operating state of the drive unit.

2. A vehicle in accordance with claim 1, wherein the sound generator is not in contact with either an exhaust system of an internal combustion engine or a fresh air feed unit of an internal combustion engine.

3. A vehicle in accordance with claim 1, wherein:
the drive unit comprises an internal combustion engine, which has an exhaust system and a fresh air feed unit; and
the emission pipe of the sound generator is arranged outside the fresh air feed unit, independently from an inlet of the fresh air feed unit and is arranged outside of the exhaust system, independently from an outlet of the exhaust system.

4. A vehicle in accordance with claim 1, wherein:
the drive unit comprises one or more electric motors and an internal combustion engine;
the vehicle is only driven by the one or more electric motors;
the internal combustion engine is used to generate power; and
the generator control device drives the electroacoustic converter as a function of the current operating state of the respective one or more electric motors.

5. A vehicle in accordance with claim 1, wherein:
the drive unit comprises one or more electric motors and no internal combustion engine; and
the generator control device drives the electroacoustic converter as a function of a current operating state of the respective one or more electric motors.

6. A vehicle in accordance with claim 5, further comprising:
another sound generator comprising another electroacoustic converter and another emission pipe directly connecting the another sound generator acoustically and fluidically with another emission space, the another emission pipe forming a tail pipe of an exhaust system and is arranged in a rear area of the vehicle, said rear area being located rearward of the passenger compartment with respect to a traveling direction of the vehicle, wherein sound is emitted in a direction away from the vehicle via at least the another emission pipe.

7. A vehicle in accordance with claim 1, further comprising:
a safety barrier arranged in the emission pipe or at an outlet end of the emission pipe.

8. A vehicle in accordance with claim 1, wherein the emission pipe comprises a tubular resonator designed for a predetermined frequency range.

9. A vehicle in accordance with claim 1, wherein:
the electroacoustic converter is arranged in a housing of the sound generator;
a membrane of the electroacoustic converter separates a front volume from a rear volume in the housing; and
the front volume is arranged in a funnel, the funnel having an inlet that adjoins the electroacoustic converter and the funnel having an outlet that adjoins the emission pipe, wherein an axial direction of the outlet is sloped in relation to an axial direction of the inlet.

10. A vehicle in accordance with claim 1, wherein the generator control device analyzes a signal correlating with the operating state of the drive unit.

11. A vehicle in accordance with claim 1, wherein the generator control device drives the electroacoustic converter as a function of the current drive output of the drive unit for generating an engine noise of an internal combustion engine.

12. A vehicle in accordance with claim 11, wherein
the generator control device is designed to generate different engine noises, which are assigned to different types of internal combustion engines;
an operating device is coupled with the generator control device for selecting one of the different engine noises to be currently generated; and
the operating device is arranged in a passenger compartment of the vehicle.

13. A vehicle in accordance with claim 11, wherein a virtual operating state, which is superimposed to the actual operating state, is sent to the generator control device by means of an operating device, which is coupled with the generator control device and can be driven manually, independently from the actual operating state of the drive unit.

14. A vehicle in accordance with claim 11, wherein:
the vehicle has no manual transmission; and
the generator control device drives the electroacoustic converter as a function of the current operating state of the drive unit for varying the engine noise, such that the engine noise acoustically also simulates shifting operations and different selected gears depending on the current operating state of the drive unit.

15. A motor vehicle comprising:
a drive unit for driving the vehicle;
a drive unit control device for driving the drive unit;
a sound generator comprising: a housing, an electroacoustic converter arranged in the housing, the electroacoustic converter comprising a membrane, which separates a rear volume from a front volume within the housing, a membrane drive for driving the membrane and an emission pipe connecting the front volume acoustically and fluidically directly with an emission space, which emission pipe emits the sound generated by the electroacoustic converter during the operation of the sound generator, the emission pipe comprising an emission pipe outlet, the sound generator being arranged in a front space of the vehicle, which the front space adjoins towards a passenger compartment of the vehicle, the emission pipe outlet facing in a direction of the passenger compartment, wherein the sound is emitted in said front space via the emission pipe, the passenger compartment being separated from the front space via structure, the emission pipe being located in the front space, the emission pipe outlet being located at a spaced location from the passenger compartment; and
a generator control device coupled with the drive unit control device driving the electroacoustic converter, the generator control device driving the membrane drive as a function of a current operating state of the drive unit.

16. A vehicle in accordance with claim 15, wherein:
the drive unit comprises an internal combustion engine, which has an exhaust system and a fresh air feed unit; and
the emission pipe of the sound generator is arranged outside the fresh air feed unit, independently from an inlet of the fresh air feed unit and is arranged outside of the exhaust system, independently from an outlet of the exhaust system and the sound generator is not in contact with either the exhaust system of the internal combustion engine or the fresh air feed unit of the internal combustion engine.

17. A vehicle in accordance with claim 16, wherein:
the drive unit comprises one or more electric motors and an internal combustion engine;
the vehicle is only driven by the one or more electric motors;
the internal combustion engine is used to generate power; and
the generator control device drives the electroacoustic converter as a function of the current operating state of the respective one or more electric motors.

18. A vehicle in accordance with claim 16, wherein:
the drive unit comprises one or more electric motors and no internal combustion engine; and
the generator control device drives the electroacoustic converter as a function of a current operating state of the respective one or more electric motors.

19. A vehicle in accordance with claim 18, further comprising:
another sound generator comprising: another housing, another electroacoustic converter arranged in the another housing, the another electroacoustic converter comprising another membrane, which separates another rear volume from another front volume within the another housing, another membrane drive for driving the another membrane and another emission pipe connecting the another front volume acoustically and fluidically directly with another emission space, which another emission pipe emits the sound generated by the another electroacoustic converter during the operation of the another sound generator, wherein the another emission pipe forms a tail pipe arranged in a rear area of the vehicle, said rear area being located rearward of the passenger compartment with respect to a traveling direction of the vehicle said another pipe comprising another pipe outlet, wherein sound is emitted via at least said another pipe to a space located outside of the vehicle.

20. A vehicle in accordance with claim 15, further comprising:
a safety barrier arranged in the emission pipe or at an end of said outlet of the emission pipe.

* * * * *